(12) United States Patent
Burnham

(10) Patent No.: US 7,600,202 B1
(45) Date of Patent: Oct. 6, 2009

(54) TECHNIQUES FOR PROVIDING A FAILURES IN TIME (FIT) RATE FOR A PRODUCT DESIGN PROCESS

(75) Inventor: Steven Burnham, Blackstone, MA (US)

(73) Assignee: EMC Corporation, Hopkinton, MA (US)

( * ) Notice: Subject to any disclaimer, the term of this patent is extended or adjusted under 35 U.S.C. 154(b) by 470 days.

(21) Appl. No.: 11/520,979

(22) Filed: Sep. 14, 2006

(51) Int. Cl.
*G06F 17/50* (2006.01)

(52) U.S. Cl. .................................... 716/4; 716/1; 716/5

(58) Field of Classification Search ............... 716/1, 716/4, 5
See application file for complete search history.

(56) References Cited

U.S. PATENT DOCUMENTS

| 5,539,652 | A  | 7/1996 | Tegethoff |
| 6,411,908 | B1 | 6/2002 | Talbott |
| 7,184,932 | B1 | 2/2007 | Lopez et al. |
| 7,200,525 | B1 | 4/2007 | Williams et al. |

OTHER PUBLICATIONS

Crook,"Evolution of VLSI Reliability Engineering", Mar. 1990, IEEE INternational Reliability Physics Symposium, Annual Proceddings, pp. 2 - 11.*

Tuttle et al.,"Matching Models to Real Life for Defect Reduction", Oct. 1995, IEEE International Test Conference, Proceddings, pp. 217 - 223.*

Vigander, "Evolutionary Fault Repair of Electronics in Space Applications", Feb. 2001, University of Sussex, Dissertation.*

"Avaya Application Solutions: IP Telephony Deployment Guide", Jan. 2005, Avaya, Issue 3.3.*

Hayashi et al.,"Transformation From Availability Expression to Failure Frequency Expression", Jun. 2006, IEEE Transactions on Reliability, vol. 55, No. 2, pp. 252 - 261.*

* cited by examiner

Primary Examiner—Sun J Lin
(74) Attorney, Agent, or Firm—BainwoodHuang

(57) ABSTRACT

A technique for providing a product FIT rate is performed within electronic circuitry (e.g., one or more computerized devices). The technique involves receiving a Mean Time To Failure (MTTF) target for a product and a Mean Time To Repair (MTTR) target for the product (e.g., a circuit board module). The technique further involves establishing a FIT rate based on the MTTF target and the MTTR target, and then outputting the FIT rate to a design process for the product (e.g., a circuit board design process). The FIT rate is a number of product failures expected per amount of time of product operation.

18 Claims, 4 Drawing Sheets

US 7,600,202 B1

TECHNIQUES FOR PROVIDING A FAILURES IN TIME (FIT) RATE FOR A PRODUCT DESIGN PROCESS

BACKGROUND

In general, failure rate is the frequency in which a component fails (e.g., the number of failures per hour). Reliability theory often denotes this rate using the Greek letter λ (lambda).

An example of a failure rate metric used by circuit board designers and manufacturers is the Mean Time To Failure (MTTF) which is simply the inverse of the failure rate (i.e., 1/λ). Accordingly, MTTF for a circuit board can be expressed as the average number of circuit board operation hours per failure.

Another example of a failure rate metric used by circuit board designers and manufacturers is the Mean Time To Repair (MTTR). MTTR for a circuit board can be expressed as the average number of hours required to repair a failed circuit board.

Yet another example of a failure rate metric used by circuit board designers and manufacturers is the Failures In Time (FIT) rate which is the number of failures that can be expected in one billion ($10^9$) hours of circuit board operation. Circuit board FIT rates are often expressed in terms of one billion hours since circuit board failure rates may be extremely low.

In connection with circuit board design, many circuit board designers maintain internal databases of failure data on circuit boards that the designers ultimately produce. The circuit boards designers then use this historical data to calculate failure rates for those circuit boards. Additionally, the circuit boards designers may calculate failure rates for future circuit boards according this historical data since the historical data may further serve as a useful estimate.

Alternatively, circuit boards designers may test samples of actual manufactured circuit boards in order to generate failure rate information. However, such circuit board testing may be prohibitively expensive or impractical. For example, to accumulate actual information in a test laboratory, such testing may require (i) sacrificing an unreasonable number of very expensive circuit boards and/or (ii) monitoring the circuit boards for an excessive amount of time.

SUMMARY

Unfortunately, there are deficiencies to the above-described approaches to obtaining and utilizing circuit board failure rate information. For example, such failure rate information is acquired after the circuit boards have been designed and/or after the circuit boards have been manufactured. At this point, the design has already been rigidly "carved in stone". That is, details such as circuit board geometries, quality of circuit board components, and soldering techniques have already been decided and implemented. Accordingly, any subsequent changes to the circuit board design would be extremely costly and burdensome to make.

In contrast to the above-described approaches to obtaining and utilizing circuit board failure rate information after a product is designed and manufactured, embodiments of the invention are directed to techniques for providing a FIT rate for use in a product design process. Such a proactive approach enables a user to make design choices based on the provided FIT rate prior to committing to particular design details. For example, in the context of a circuit board design process, a circuit board designer is now capable of selecting particular circuit board characteristics (such as layer thickness, materials, etc.), components (such as vendors, qualification criteria, chip speeds, etc.) and soldering techniques (such as flux choices, solder composition, etc.) in response to an allocated FIT rate for a particular circuit board design, or for a particular circuit board subsystem. As a result, circuit board designers enjoy improved flexibility (e.g., initial design choices based on FIT rates rather than modifications to existing designs based on FIT rates) and enhanced reliability control (e.g., preset failure rates rather than failure rates determined after design completion).

One embodiment is directed to a method for providing a product FIT rate which is performed within electronic circuitry (e.g., one or more computerized devices). The method includes receiving a Mean Time To Failure (MTTF) target for a product and a Mean Time To Repair (MTTR) target for the product (e.g., a circuit board module). The method further includes establishing a FIT rate based on the MTTF target and the MTTR target, and then outputting the FIT rate to a design process for the product (e.g., a circuit board design process). The FIT rate is a number of product failures expected per amount of time of product operation. Such a technique enables a user to mathematically derive and then utilize failure budgets for the major subsystems of the product (e.g., major circuits) at the conceptual phase of the design process.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for providing a Failures In Time (FIT) rate for use in a product design process. Such proactive employment of a FIT rate enables a user to make design choices based on the FIT rate prior to committing to particular design details. For example, in the context of a circuit board design process, a circuit board designer is now capable of selecting particular circuit board characteristics (such as layer thickness, materials, etc.), components (such as vendors, qualification criteria, chip speeds, etc.) and soldering techniques (such as flux choices, solder composition, etc.) in response to an allocated FIT rate for a particular circuit board module design, or for a particular circuit board subsystem design. Accordingly, circuit board designers enjoy improved flexibility. That is, designers are now able to make initial design choices based on FIT rates rather than modifications to existing designs based on FIT rates. As a result, designers and manufacturer obtain enhanced reliability control, i.e., designers are able to rely on preset failure rates to guide design choices rather than conventionally limit themselves to back-end acquired failure rates determined after design completion which merely guide potential modification choices or product support budgets after product design is complete.

Figure 1:
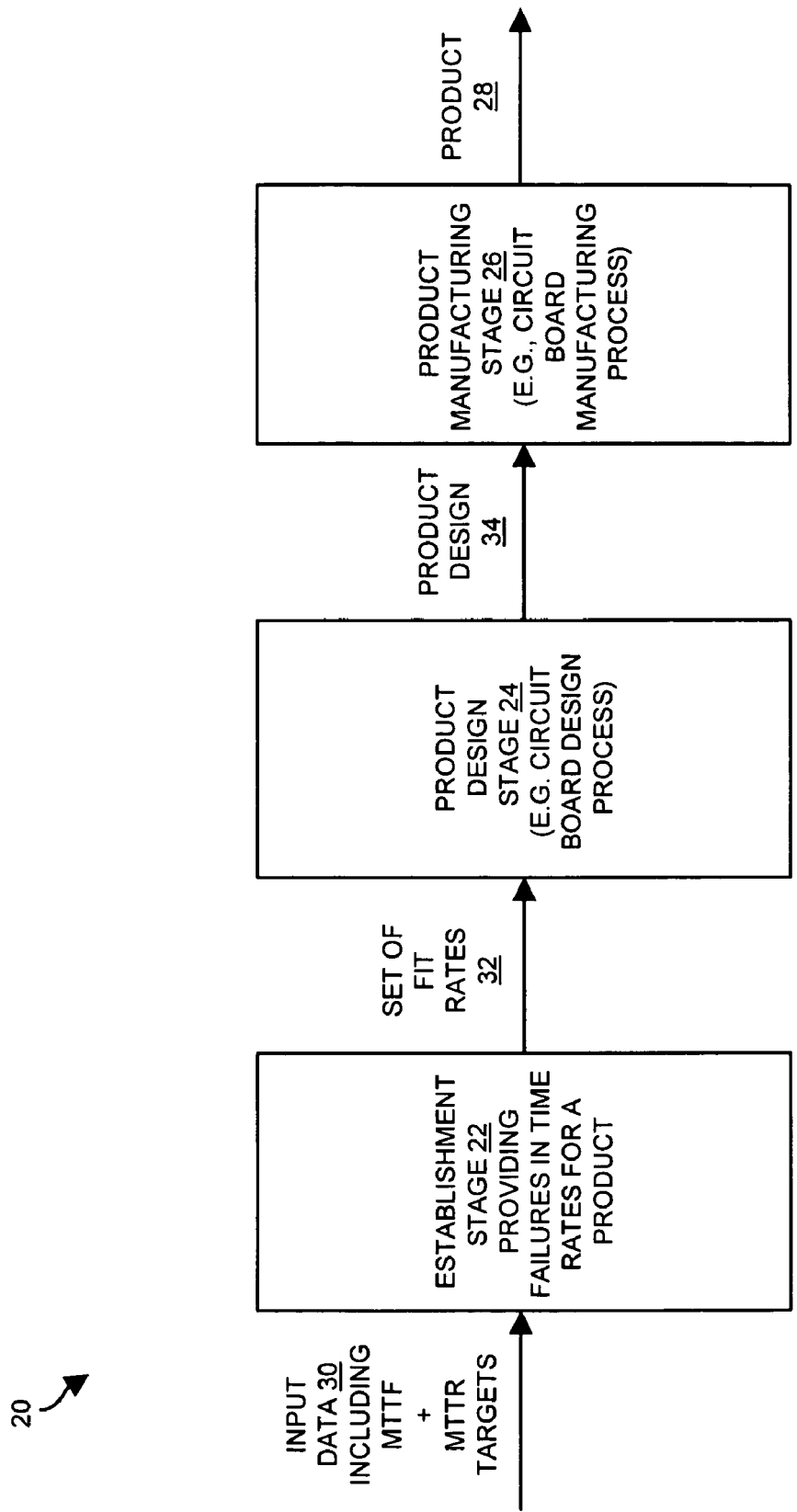
FIG. 1 is a block diagram of a system which generates and then utilizes a FIT rate as part of a design and manufacturing process.

FIG. 1 is a block diagram of a product design and manufacturing system 20 which is configured to generate and then utilize a FIT rate relatively early in the product design process. The product design and manufacturing system 20 includes a FIT establishment stage 22, a product design stage 24 and a product manufacturing stage 26 which are arranged in a serial manner to design and manufacture a product 28. The stages 22, 24, 26 involve the use of electronic circuitry (e.g., computerized equipment connected via a network). By way of example, the system 20 is configured for the design and manufacture of a circuit board module, i.e., a fabricated circuit board having a variety of circuit board components assembled thereon.

During operation of the system 20, the FIT establishment stage 22 is configured to receive a variety of input data 30 such as a Mean Time To Failure (MTTF) target for the product 28 and a Mean Time To Repair (MTTR) target for the product 28 among other information. The FIT establishment stage 22 is further configured to output a set of FIT rates 32 (i.e., one or more FIT rates) in response to the input data 30.

The product design stage 24 is then configured to generate a product design 34 (e.g., a new design for a circuit board module) based on the set of FIT rates 32. For example, if the FIT rate for the overall product 28 is extremely demanding, the product designer may choose to incorporate higher quality components into the product design 34 in order to achieve the established FIT rate. As another example, if the FIT rate for a particular subsystem of the product 28 is extremely demanding, the product designer may be able to use standard quality components (e.g., common components) on other subsystems but may choose to incorporate higher quality components into the particular subsystem in order to achieve a particular subsystem reliability and thus the established FIT rate for the overall product 28.

At this point, it should be clear that the established set of FIT rates 32 (i.e., an overall FIT rate and individual subsystem FIT rates) is influential in the design process. Such information is more than simple metrics derived from historical data which are generated after the product design is completed as in conventional approaches. Rather, the set of FIT rates 32 is generated proactively ahead of product design and then utilized within the design process itself thus enabling design engineers to make informed choices. In the context of circuit board design and manufacturing, the system 20 thus enables circuit board designers to make intelligent design tradeoffs at the front-end of the design process before the initial prototype builds of the circuit board modules.

The product manufacturing stage 26 is then configured to manufacture the product 28 based on the product design 34. Accordingly, the product 28 benefits from front-end factoring of failure rate information. Further details will now be provided with reference to FIG. 2.

Figure 2:
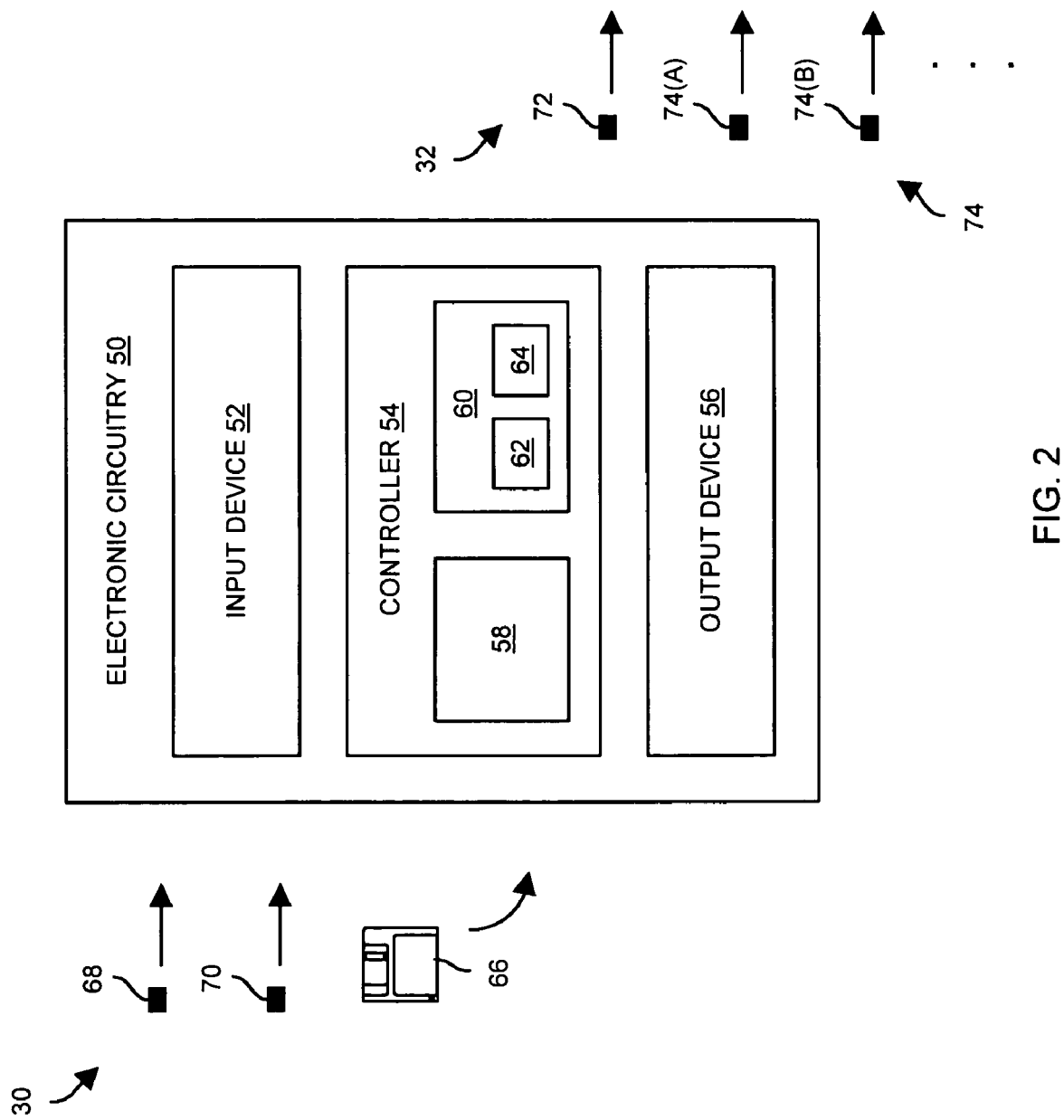
FIG. 2 is a block diagram of electronic circuitry of the system of FIG. 1.

FIG. 2 is a block diagram of electronic circuitry 50 which is configured to establish the set of FIT rates 32 (also see the FIT establishment stage 22 of the system 20 in FIG. 1). The electronic circuitry 50 includes an input device 52, a controller 54 and an output device 56. The electronic circuitry 50 may reside locally (e.g., in a single housing or one equipment rack) or be remotely distributed (e.g., various electronic components being distributed over a network).

In some arrangements, the electronic circuitry 50 is a computer with various computer peripherals operating as the input device 52 (e.g., keyboard and mouse, a network interface, etc.) and as the output device 56 (e.g., a computer display, a network interface, etc.). In these arrangements, the controller 54 is formed by a set of computer processors 58 and memory 60 which stores a set of applications 62 and other software constructs 64 (e.g., an operating system). One or more of the applications 62 is capable of being delivered to the electronic circuitry 50 in the form of one or more computer program products 66. Although the computer program products 66 are illustrated as a floppy diskette icon by way of example only, a variety of communications and storage media are suitable for use (e.g., a set of CD-ROMs, tapes, memory cards or sticks, network downloads, propagated signals, combinations thereof, etc.). Alternatively, the application 62 is initially an installed generic tool (e.g., a spreadsheet or similar tool) which is then configured to generate the set of FIT rates 32 by a user operating the input device 52.

During operation of the electronic circuitry 50, the controller 54 is configured to receive an MTTF target 68 for the product 28 and an MTTR target 70 for the product 28 through the input device 52. The controller 54 is then configured to establish an overall FIT rate 72 and individual subsystem FIT rates 74(A), 74(B) (collectively, subsystem FIT rates 74) for the product 28 based on the MTTF target 66 and the MTTR target 68 along with other information (e.g., subsystem data). The controller 54 is then configured to provide the established set of FIT rates 32 to the design process stage 24 (FIG. 1) through the output device 56.

The overall FIT rate 72 is the number of product failures expected per amount of time of operation of the resulting product 28 (FIG. 1). Similarly, each subsystem FIT rate 74 is the number of product failures expected per amount of operation time of a particular subsystem of the product 28. Further details will now be provided with reference to FIGS. 3 and 4.

Figure 3:
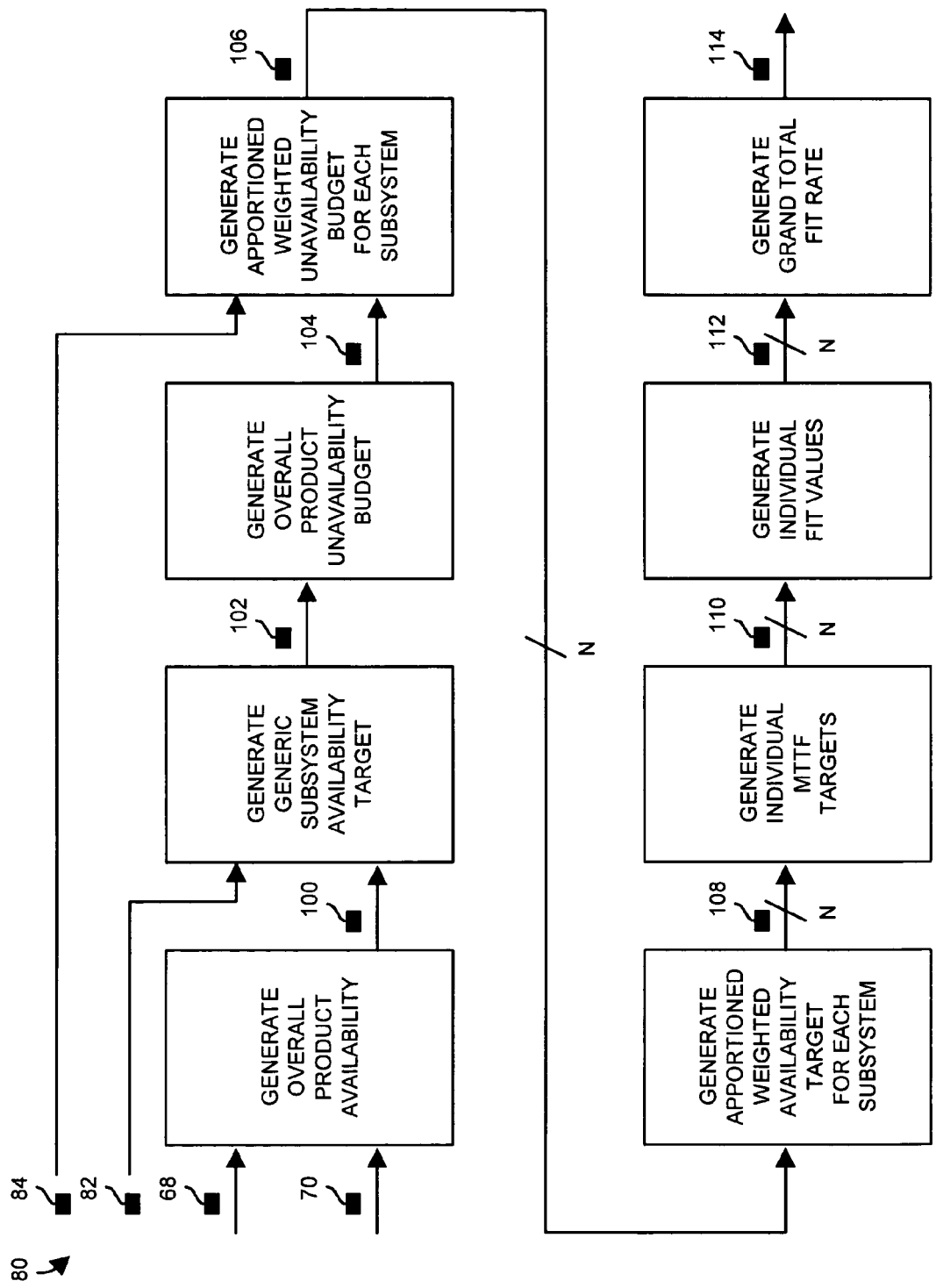
FIG. 3 is a block diagram of particular operational phases carried out by the electronic circuitry of FIG. 2.
Figure 4:
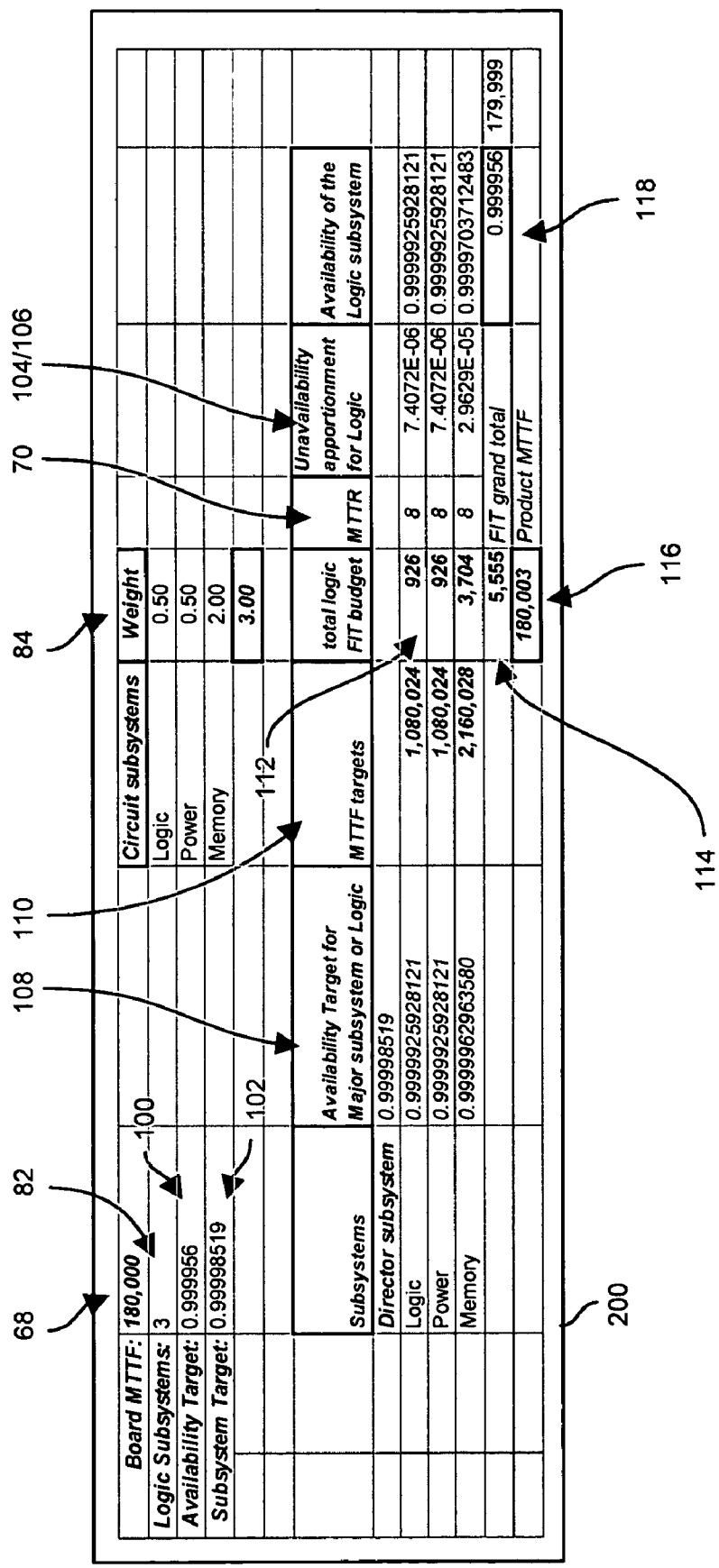
FIG. 4 is an exemplary view of an output provided by the electronic circuitry of FIG. 2.

FIG. 3 is a block diagram of particular operational phases carried out by the electronic circuitry 50 of FIG. 2 when establishing the set of FIT rates 32, and FIG. 4 is an exemplary view of an output 200 provided by the electronic circuitry 50 (FIG. 2). By way of example only, the output device 56 is a computer display (i.e., a monitor showing the data in a spreadsheet format or other GUI layout) which is configured to visually render the set of FIT rates 32 as well as other generated information to a user. However, it should be understood that in other arrangements, the output device 56 includes storage and/or network circuitry in order to store and/or output the information in the form of a set of data files (e.g., see the set of FIT rates 32 in FIGS. 1 and 2) which is capable of being conveyed electronically over a network to other electronic circuitry (e.g., other computers) for the design process and the manufacturing process.

Initially, a user enters predefined information into the system 20 (e.g., from an architecture specification). In particular, the user enters the MTTF target 68 (e.g., 180,000 operating hours per circuit board failure) and the MTTR target 70 (e.g., eight hours per circuit board repair for a subsystem failure) into the electronic circuitry 50.

The user also enters other information 80 such as a number of subsystems 82 for the product 28, whether any of the subsystems 82 has multiple sub-units, and input weights 84 for each subsystem 82. Along these lines, if there are N subsystems 82, the user enters N weights (one weight for each subsystem 82). By way of example, there are three (3) subsystems for a circuit board module, i.e., a logic subsystem, a power subsystem, and a memory subsystem. The memory subsystem contains eight (8) sub-units (e.g., banks of memory).

The controller 54 (FIG. 2) is configured to receive the MTTF target 68 and the MTTR target 70 as input signals through the input device 52, and to generate an overall product availability target 100 as an output signal based on the MTTF target 68 and the MTTR target 70. Equation (1) illustrates how to determine the overall product availability target 100.

$$\text{Overall Product Availability} = \frac{MTTF}{MTTF + MTTR} \quad (1)$$

The overall product availability target 100 indicates a percentage of time that the product 28 is expected to be in operable condition (e.g., 99.9956 percent).

Additionally, the controller 54 is configured to formulate a generic subsystem availability target 102 based on the overall product availability target 100 and the identified number of product subsystems 82. Equation (2) illustrates how to determine the generic subsystem availability target 102.

$$\substack{\text{Generic Subsystem} \\ \text{Availability} \\ \text{Target}} = \substack{\text{Overall} \\ \text{Product} \\ \text{Availability}} \wedge \wedge \left(\frac{1}{\text{Number of Subsystems}}\right) \quad (2)$$

The generic subsystem availability target 102 indicates a percentage of time that a product subsystem 82 is generally expected to be in operable condition.

Furthermore, the controller 54 is configured to calculate an overall product unavailability budget 104. Equation (3) illustrates how to determine the overall product unavailability budget 104.

$$\substack{\text{Overall Product} \\ \text{Unavailability} \\ \text{Budget}} = 1 - \substack{\text{Overall Product} \\ \text{Availability} \\ \text{Budget}} \quad (3)$$

The overall product unavailability budget 104 indicates a percentage of time that the product will be in unavailable condition due to a failure. By way of example, the overall product unavailability budget 104 is not displayed in FIG. 4 (and thus simply illustrated as reference numeral 104 in FIG. 4) but nevertheless used as the input data for the next calculation.

After the controller 54 calculates the overall product unavailability budget 104, the controller 54 is configured to generate an apportioned weighted product unavailability budget 106 for each product subsystem 82. Recall that there are N weights 84 (one for each subsystem 82. Accordingly, the controller 54 provides N apportioned weighted product unavailability budgets 106. Equation (4) illustrates how the controller 54 generates an apportioned weighted product unavailability budget 106 for a particular product subsystem 82.

$$\substack{\text{Apportioned Weighted} \\ \text{Product Unavailability} \\ \text{Budget}} = \substack{\text{Weight For} \\ \text{Particular} \\ \text{Subsystem}} \times \substack{\text{Overall Product} \\ \text{Availability} \\ \text{Budget}} \quad (4)$$

In particular, each apportioned subsystem unavailability budget 106 indicates a percentage of time that a particular product subsystem is expected to be in inoperable condition. By way of example, the average weight is set to 1.0 and the memory subsystem is given a higher weight (2.00) thus requiring a reduction in the weights of the other subsystems to maintain an average weight of 1.0.

The controller 54 is then configured to provide apportioned subsystem availability targets 108 for each product subsystem 82. Since there are N apportioned weighted product unavailability budgets 106, the controller 54 provides N apportioned weighted product availability targets 108. Equation (5) illustrates how the controller 54 generates an apportioned weighted subsystem availability target 108 for a particular product subsystem 82.

$$\substack{\text{Apportioned Subsystem} \\ \text{Availability} \\ \text{Target}} = 1 - \substack{\text{Apportioned Weighted} \\ \text{Product Unavailability} \\ \text{Budget}} \quad (5)$$

Each apportioned subsystem availability target 108 indicates a percentage of time that a particular product subsystem 82 is expected to be in operable condition.

At this point, the controller 54 is configured to generate individual MTTF targets 110 for the product subsystems 82 based on the apportioned subsystem availability targets 108. Since there are N apportioned weighted product availability targets 108, the controller 54 provides N individual MTTF targets 110. Equation (6) illustrates how the controller 54 generates an individual MTTF target 110 for a particular product subsystem 82 where the apportioned subsystem availability corresponds to that particular product subsystem 82.

$$\text{Individual } MTTF \text{ Target} = \frac{(A \times MTTR)}{(1 - A)} \quad (6)$$

where A is the apportioned subsystem availability target 108 for the particular product subsystem 82. Each individual MTTF target 110 indicates an average amount of time of operation of a particular subsystem 82 before a failure of that subsystem 82.

Next, the controller 54 is configured to provide individual FIT values 112 for the individual product subsystems 82 based on division of a predefined amount of operating time (e.g., one billion hours) by the generated individual MTTF targets 110. Since there are N individual MTTF targets 110, the controller 54 provides N individual FIT values 112, i.e., one FIT value 112 for each subsystem 82. Equation (7) illustrates how the controller 54 generates individual FIT values 112 for a particular product subsystem 82.

$$\text{Individual FIT Value} = \frac{1 \times 10^9}{\text{Individual } MTTF \text{ Target}} \quad (7)$$

Each FIT value 112 indicates a number of failures expected to occur within an associated product subsystem 82 in the predefined amount of operating time.

Additionally, the controller 54 is configured to sum the individual FIT values 112 to produce an overall FIT value 114. The overall FIT value 114 indicates a grand total number of failures expected to occur within the product, which results from the design process, in the predefined amount of operating time.

The overall FIT value 114 is essentially the FIT rate 72 described above in connection with FIG. 2. Similarly, the individual FIT values 112 are essentially the subsystem FIT rates 74 (also see FIG. 2). These FIT values 112, 114 form the set of FIT rates 32 which are then utilized by the product design process 24. In particular, in the context of a design process for a circuit board module, circuit board designers are now able to make intelligent design proactively at the front-end of the design process before the initial prototype builds of the circuit board modules.

In the circuit board module example of FIG. 4, the circuit board designers now know that they must design a circuit board module with a FIT rate of 5,555 failures in one billion hours. Additionally, the memory designers must design the memory subsystem of the circuit board module with a Fit rate of 3,704 failures in one billion hours. Furthermore, the logic and power designers must design the logic and power subsystems such that each subsystem has a FIT rate of 926 failures in one billion hours.

Moreover, it should be understood that additional processing phases and verifications are available. For example, the MTTF value for product 28 can be recalculated based on the overall FIT value 114 and compared to the originally entered MTTF value 68 for confirmation (see the arrow 116 in FIG. 4 which represents this verification process). Similarly, the individually apportioned availabilities for each subsystem can be calculated and summed, and then compared to the overall product availability 100 as another confirmation (see the arrow 118 in FIG. 4 which represents this verification process). Such operation result in robust and reliable failure metric generation, apportionment and utilization.

As described above, embodiments of the invention are directed to techniques for providing a FIT rate 112 for use in a product design process. Such proactive employment of a FIT rate 112 enables a user to make design choices based on the FIT rate prior to committing to particular design details. For example, in the context of a circuit board design process, a circuit board designer is now capable of selecting particular circuit board characteristics (such as layer thickness, materials, etc.), components (such as vendors, qualification criteria, chip speeds, etc.) and soldering techniques (such as flux choices, solder composition, etc.) in response to an allocated FIT rate for a particular circuit board module design, or for a particular circuit board subsystem design. Accordingly, circuit board designers enjoy improved flexibility. That is, designers are now able to make initial design choices based on FIT rates rather than modifications to existing designs based on FIT rates. As a result, designers and manufacturer obtain enhanced reliability control, i.e., designers are able to rely on predetermined failure rates to guide design choices rather than limit themselves to back-end acquired failure rates determined after design completion which merely guide potential modification choices or product support budgets after product design is complete.

While this invention has been particularly shown and described with references to preferred embodiments thereof, it will be understood by those skilled in the art that various changes in form and details may be made therein without departing from the spirit and scope of the invention as defined by the appended claims.

For example, the system 20 was described above as generating overall and apportioned FIT rates 32 for a circuit board module by way of example only. The system 20 is well-suited for generating FIT rates 32 for other types of products having multiple subsystems as well (e.g., computer systems, electronic systems, mechanical products, software products, combinations thereof and the like).

What is claimed is:

1. A method, performed by electronic circuitry, for providing a Failures In Time (FIT) rate for a product, the method comprising:
   receiving a Mean Time To Failure (MTTF) target for the product and a Mean Time To Repair (MTTR) target for the product;
   establishing the FIT rate based on the MTTF target and the MTTR target; and
   outputting the FIT rate to a design process for the product, the FIT rate being a number of product failures expected per amount of time of product operation;
   wherein establishing the FIT rate based on the MTTF target and the MTTR target includes generating an overall product availability target based on the MTTF target and the MTTR target, the overall product availability target indicating a percentage of time that the product is expected to be in operable condition; and
   wherein establishing the FIT rate based on the MTTF target and the MTTR target further includes:
      identifying a number of product subsystems of the product, and
      formulating a generic subsystem availability target based on (i) the overall product availability target and (ii) the identified number of product subsystems, the generic subsystem availability target indicating a percentage of time that a product subsystem is expected to be in operable condition on average.

2. The method as in claim 1 wherein establishing the FIT rate based on the MTTF target and the MTTR target further includes:
   inputting weights for the product subsystems of the product;
   providing an overall product unavailability budget; and
   weighting the overall product unavailability budget by the inputted weights to obtain apportioned subsystem unavailability budgets for the product subsystems, each apportioned subsystem unavailability budget indicating a percentage of time that a particular product subsystem is expected to be in inoperable condition.

3. The method as in claim 2 wherein the design process is configured to design a circuit board module having multiple circuit subsystems; and wherein each weight is associated with a particular one of the circuit subsystems.

4. The method as in claim 2 wherein establishing the FIT rate based on the MTTF target and the MTTR target further includes:
   outputting apportioned subsystem availability targets for the product subsystems based on the apportioned subsystem unavailability budgets for the product subsystems, each apportioned subsystem availability target indicating a percentage of time that a particular product subsystem is expected to be in operable condition.

5. The method as in claim 4 wherein establishing the FIT rate based on the MTTF target and the MTTR target further includes:
   generating individual MTTF targets for the product subsystems based on the apportioned subsystem availability targets, each MTTF target indicating an average amount of time of subsystem operation before a subsystem failure.

6. The method as in claim 5 wherein establishing the FIT rate based on the MTTF target and the MTTR target further includes:
   providing individual FIT values for the individual product subsystems based on division of a predefined amount of operating time by the generated individual MTTF targets, each FIT value indicating a number of failures expected to occur within an associated product subsystem in the predefined amount of operating time.

7. The method as in claim 6 wherein establishing the FIT rate based on the MTTF target and the MTTR target further includes:
summing the individual FIT values to produce an overall FIT value as the FIT rate, the overall FIT value indicating a grand total number of failures expected to occur within the product, which results from the design process, in the predefined amount of operating time.

8. The method as in claim 1 wherein outputting the FIT rate to the design process for the product includes:
providing the FIT rate to a circuit board design process configured to design a circuit board module having multiple circuit board components.

9. The method as in claim 8 wherein providing the FIT rate to the circuit board design process includes:
electronically outputting an electronic signal to a circuit board design process receiving circuit, the electronic signal representing the FIT rate.

10. Electronic circuitry for providing a Failures In Time (FIT) rate for a product, the electronic circuitry comprising:
an input device configured to receive a Mean Time To Failure (MTTF) target for the product and a Mean Time To Repair (MTTR) target for the product;
a controller coupled to the input device, the controller being configured to establish the FIT rate based on the MTTF target and the MTTR target; and
an output device coupled to the controller, the output device being configured to output the FIT rate to a design process for the product, the FIT rate being a number of product failures expected per amount of time of product operation;
wherein the controller, when establishing the FIT rate based on the MTTF target and the MTTR target, is configured to generate an overall product availability target based on the MTTF target and the MTTR target, the overall product availability target indicating a percentage of time that the product is expected to be in operable condition;
wherein the controller, when establishing the FIT rate based on the MTTF target and the MTTR target, is further configured to:
identify a number of product subsystems of the product, and
formulate a generic subsystem availability target based on (i) the overall product availability target and (ii) the identified number of product subsystems, the generic subsystem availability target indicating a percentage of time that a product subsystem is expected to be in operable condition on average.

11. The electronic circuitry as in claim 10 wherein the controller, when establishing the FIT rate based on the MTTF target and the MTTR target, is further configured to:
input weights for the product subsystems of the product;
provide an overall product unavailability budget; and
weight the overall product unavailability budget by the inputted weights to obtain apportioned subsystem unavailability budgets for the product subsystems, each apportioned subsystem unavailability budget indicating a percentage of time that a particular product subsystem is expected to be in inoperable condition.

12. The electronic circuitry as in claim 11 wherein the design process is configured to design a circuit board module having multiple circuit subsystems; and wherein each weight is associated with a particular one of the circuit subsystems.

13. The electronic circuitry as in claim 11 wherein the controller, when establishing the FIT rate based on the MTTF target and the MTTR target, is further configured to:
output apportioned subsystem availability targets for the product subsystems based on the apportioned subsystem unavailability budgets for the product subsystems, each apportioned subsystem availability target indicating a percentage of time that a particular product subsystem is expected to be in operable condition.

14. The electronic circuitry as in claim 13 wherein the controller, when establishing the FIT rate based on the MTTF target and the MTTR target, is further configured to:
generate individual MTTF targets for the product subsystems based on the apportioned subsystem availability targets, each MTTF target indicating an average amount of time of subsystem operation before a subsystem failure.

15. The electronic circuitry as in claim 14 wherein the controller, when establishing the FIT rate based on the MTTF target and the MTTR target, is further configured to:
provide individual FIT values for the individual product subsystems based on division of a predefined amount of operating time by the generated individual MTTF targets, each FIT value indicating a number of failures expected to occur within an associated product subsystem in the predefined amount of operating time.

16. The electronic circuitry as in claim 15 wherein the controller, when establishing the FIT rate based on the MTTF target and the MTTR target, is further configured to:
sum the individual FIT values to produce an overall FIT value as the FIT rate, the overall FIT value indicating a grand total number of failures expected to occur within the product, which results from the design process, in the predefined amount of operating time.

17. The electronic circuitry as in claim 10 wherein the controller, when establishing the FIT rate based on the MTTF target and the MTTR target, is further configured to:
provide the FIT rate to a circuit board design process configured to design a circuit board module having multiple circuit board components.

18. The electronic circuitry as in claim 17 wherein the controller, when providing the FIT rate to the circuit board design process, is configured to:
electronically output an electronic signal to a circuit board design process receiving circuit, the electronic signal representing the FIT rate.

* * * * *